United States Patent [19]

Marikovsky

[11] Patent Number: 4,579,105
[45] Date of Patent: Apr. 1, 1986

[54] METHOD OF PREVENTING DUSTING OF SOLAR PONDS

[75] Inventor: Moshe Marikovsky, Rehovot, Israel

[73] Assignee: Solmat Systems, Ltd., Yavne, Israel

[21] Appl. No.: 625,581

[22] Filed: Jun. 29, 1984

Related U.S. Application Data

[63] Continuation of Ser. No. 397,409, Jul. 12, 1982, abandoned.

[30] Foreign Application Priority Data

Jul. 10, 1982 [IL] Israel .................................. 63281

[51] Int. Cl.$^4$ ................................................. F24J 3/02
[52] U.S. Cl. .................................. 126/415; 210/242.1; 4/490
[58] Field of Search ......................... 126/415, 416, 452; 60/641.1, 641.6, 641.8; 4/490; 210/242.1, 776

[56] References Cited

U.S. PATENT DOCUMENTS

| | | | |
|---|---|---|---|
| 1,917,614 | 7/1933 | Test | 4/490 |
| 3,438,205 | 4/1969 | Lindstrom | 210/242.1 |
| 4,091,800 | 5/1978 | Fletcher et al. | 126/415 |
| 4,440,148 | 4/1984 | Assaf | 126/415 |

FOREIGN PATENT DOCUMENTS

236337 10/1960 Australia ............................ 126/415

OTHER PUBLICATIONS

L. Wittenberg, "Salt-Gradient Solar Ponds: Design, Construction and Power Production", *Solar Energy Conversion II*, Aug. 1980, p. 421.

H. Tabor, "Large-Area Solar Collectors for Power Production", *Solar Energy*, vol. 7, No. 4, 1963, pp. 189–194.

A. V. Kalecsinsky, "The Warm Hungarian Lakes as Accumulators of Heat . . . ", *Annalen der Physik*, IV, No. 7, 1902, pp. 408–416.

H. Tabor, "Large Area Solar Collectors (Solar Ponds) for Power Production", *U.N. Conference of New Sources of Energy*, S/47, New York, Apr. 21, 1961, p. 3.

H. Weinberger, "The Physics of the Solar Pond", *Solar Energy*, vol. B. #2, 1964.

A. Rabl and C. E. Nielsen, "Solar Ponds for Space Heating", USA 1974.

*Primary Examiner*—Margaret A. Focarino
*Attorney, Agent, or Firm*—Sandler & Greenblum

[57] ABSTRACT

Dusting of a solar pond having an upper wind-mixed layer is controlled by providing a vertically oriented drain on a downwind side of the pond. The drain has an upper, open, free-end spaced above the level of the surface of the pond in the absence of wind. When wind blows across the pond, surface water piles-up at the downwind side of the pond creating a hydraulic head relative to the open free end of the drain with the result that surface water and debris floating thereon are drawn toward and into the drain.

13 Claims, 5 Drawing Figures

METHOD OF PREVENTING DUSTING OF SOLAR PONDS

This application is a continuation of application Ser. No. 397,409, filed July 12, 1982, and now abandoned.

The present invention concerns solar ponds.

In order to optimize the penetration of impinging solar radiation into solar ponds so as to reach the zone of highest density the turbidity of the pond should be minimized. It has now been found that atmospheric dust contributes significantly to the undesired turbidity of solar ponds. The turbidity caused by atmospheric dust in solar ponds is due to two effects: firstly, the dust itself forms a suspension in the aqueous solution of the pond, and secondly, the so-suspended dust is a nutrient for various micro-organisms such as algae and bacteria which thus are able to develop and multiply and are an additional, significant source of turbidity.

It is the object of the present invention to overcome this problem.

Experiments conducted in accordance with the present invention have shown that a particle of atmospheric dust that precipitates into a solar pond remains for a while confined to a very thin upper layer, as a rule not exceeding 1 mm thickness, and only thereafter penetrates into the body of the solution. It is believed that this delay in the penetration of the dust into the body of the solution is due to the surface tension of the aqueous solution in the pond in consequence of which the wetting of the dust particles precipitating from the atmosphere proceeds only slowly.

Based on this observation, the invention provides a method for preventing dusting of a solar pond comprising skimming the pond continuously or intermittently so as to withdraw an upper, aqueous layer thereof.

It has been found that in this way wetting and sinking of the dust particles is prevented and the solution in the pond remains essentially clear.

If desired, retention of the dust particles in the upper layer of the pond may be enhanced by the addition of wetting retarders, i.e., substances that increase the surface tension, or hydrophobic materials, such as oils.

The skimming can be effected in various ways. For example, overflow of the solution at selected locations along the edges may be caused to occur continuously or intermittently, drainage means being provided for receiving and withdrawing the overflow solution. Such overflow may be combined with other operational proceedings. For example, as is well known in the art, the solution in the pond has to be made up continuously or periodically for the maintenance of the desired halocline and pycnocline and also to compensate for evaporation losses. Such make-up operation may be combined with the dust removal operation in accordance with the invention so as to induce the desired overflow.

By another embodiment, the intermittent or continuous skimming of an upper layer from the pond is brought about with the aid of suitably located suction pumps.

In accordance with a particular advantageous embodiment of the invention use is made of the wind effect on the pond. As a rule, solar ponds are of comparative large size such that the blowing wind gives rise to the formation of small waves. As is also known, the wind directions in given locations is more or less regular and is reversed between day and night. Use can be made of this effect for skimming the pond in accordance with the invention by so designing the edges or a portion thereof as to protrude above the solution level sufficiently to retain the solution when it is not windy while enabling overflow when the wind is blowing.

Alternatively, it is also possible to provide within the pond at selected locations collector means which protrude above the solution level when it is not windy and which are capable of receiving the solution by overflow when it is windy.

Such collector means may if desired be mobiled, e.g., floating, to make allowance for any deviations of the direction of the wind from the normal. In either case means will be provided for the drainage of the overflow solution.

In accordance with yet another embodiment of the invention, at least one vertically reciprocable gate is provided which in its uppermost position retains the solution in the pond while in a lower position enables a free flow of an upper layer from the pond. Drainage means may be associated with each gate.

The upper layer of a solar pond withdrawn from the pond in accordance with the invention may be filtered and then returned to the pond. However, in many cases that may not be worthwhile and the withdrawn solution is discarded or used otherwise.

The invention is illustrated by way of example only, in the accompanying drawings in which.

Figure 1:
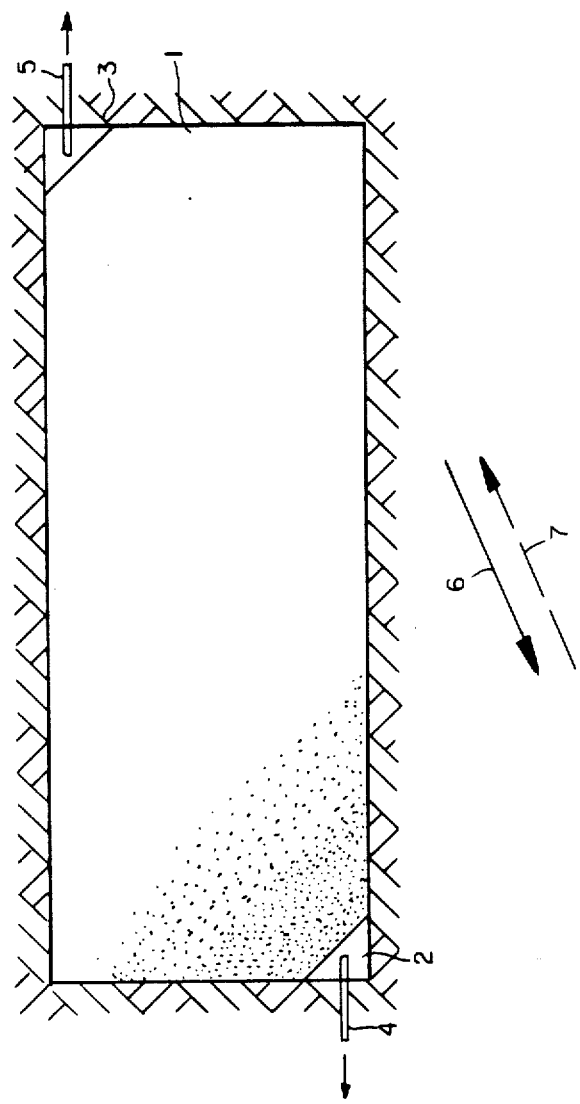
FIG. 1 is a diagrammatic plan view of a rectangular solar pond fitted with two oppositely located collector troughs in accordance with the invention.

As shown in FIG. 1, a rectangular solar pond 1 comprised at two opposite corners collector troughs 2 and 3 each so designed as to receive any overflow due to the action of the wind. One of the troughs 2 and 3 faces the wind during the day and the other during the night. The troughs 2 and 3 are fitted with drainage pipes 4 and 5, respectively, for the withdrawal of any skimmed-off solution. The directions of the wind during the day and night are indicated, respectively, by arrows 6 and 7.

Figure 2:
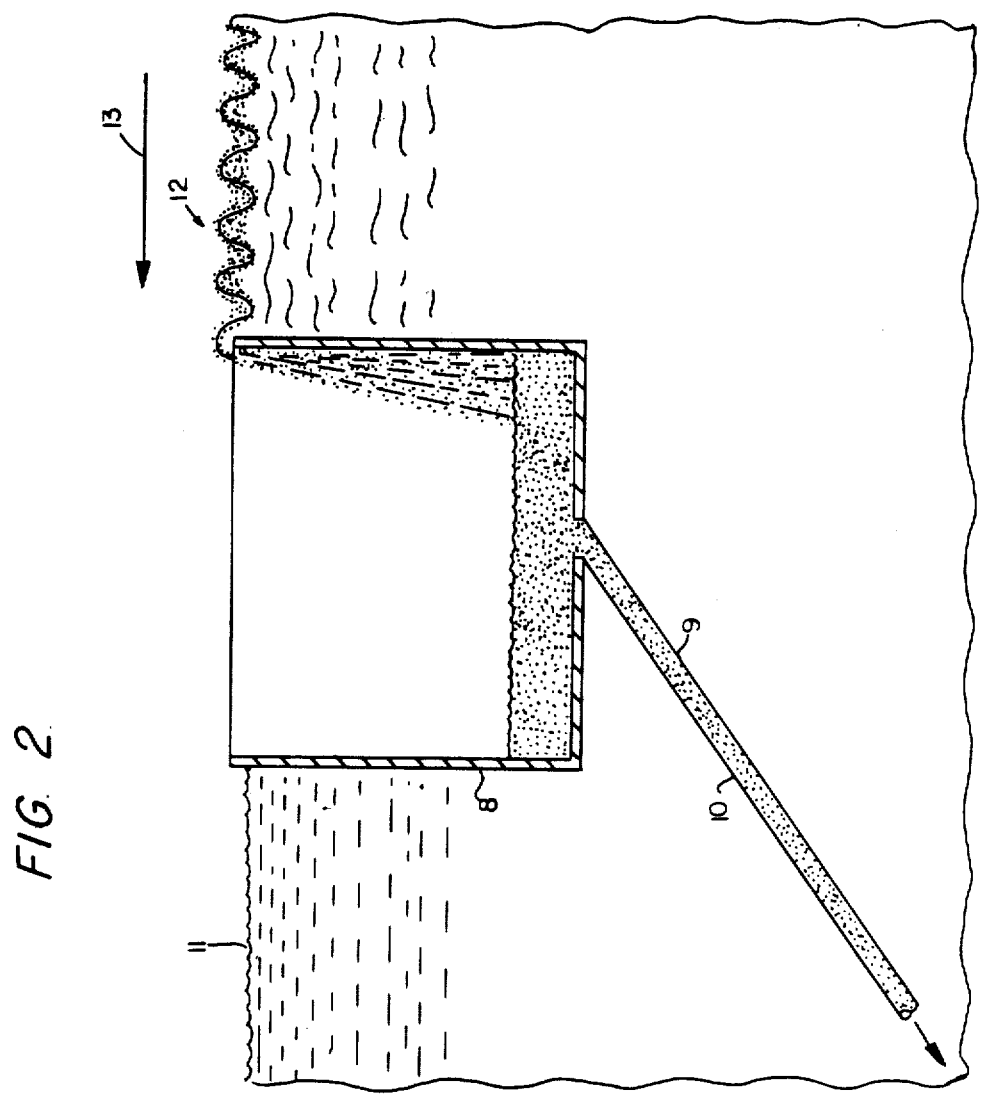
FIG. 2 is a diagrammatic fragmentary cross section of a solar pond fitted with a collector trough in accordance with the invention.

According to FIG. 2 a collector trough 8 is installed in a solar pond and is fitted with a drainage pipe 9 and a shut-off valve 10. On the left-hand side of trough 8, the surface 11 of the solution in the pond is shown to be calm and in this state it is slightly below the rim of trough 8. On the right-hand side of trough 8, the surface 12 is shown to be agitated in consequence of the wind blowing in the direction of arrow 13. In this agitated state the waves exceed the height of trough 8 and an upper layer of the pond solution with an accumulation of dust particles therein overflows into trough 8 from where it drains off through drainage pipe 9.

Figure 2A:
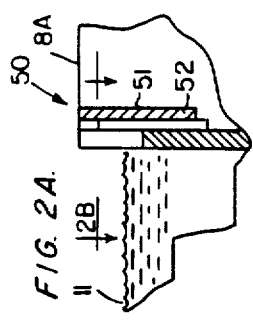
FIG. 2A is a cross-sectional view of the movable gate positioned in the circle shown in FIG. 2.
Figure 2B:
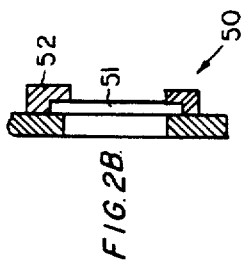
FIG. 2B is a top view of the movable gate.

FIG. 2A illustrates movable gate 50 which is provided to control the flow of water from the pond. Movable gate 50 includes gate 51 and guide 52 for holding gate 51 in position. Movable gate 50 is operated such that it is maintained in an uppermost position for preventing the flow of water from the pond and placed in its lowermost position to enable the free flow of water from the pond. Movable gate 50 is operated in response to the wind speed; when the wind speed exceeds a predetermined threshold, movable gate 50 is opened to allow the free flow of water and when the wind speed is below that threshold, the gate is kept closed.

Figure 3:
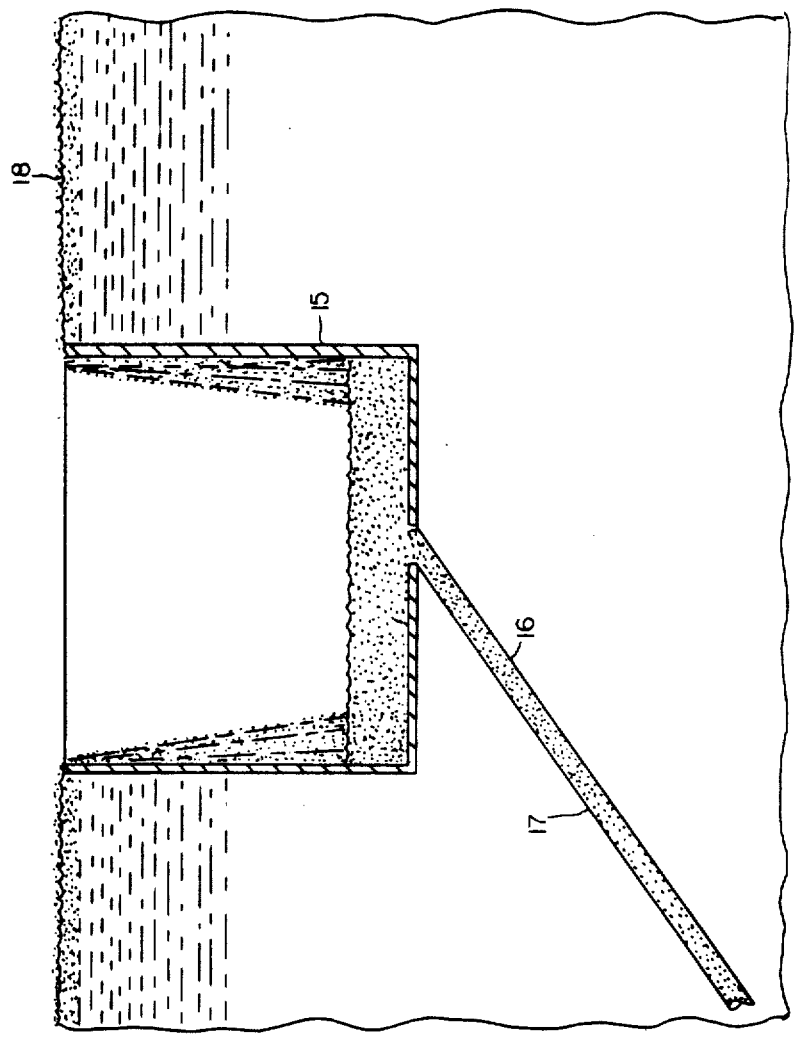
FIG. 3 is a fragmentary cross section of another embodiment of a solar pond fitted with a collector trough in accordance with the invention.

In FIG. 3 a collector trough 15 fitted with a drainage pipe 16 having a shut-off valve 17 is shown to be mounted within a solar pond in such a fashion that the rim of the trough is slightly depressed below the surface 18 of the solution in the pond. In this embodiment, the upper, dusty layer of the solution flows continuously into the trough from where it is drained off through pipe 16.

I claim:

1. A method for removing debris that floats on the surface of a salt-water solar pond having a convective wind mixed layer covering a halocline having a downwardly directed salt gradient overlying a heat storage layer, said method comprising:
    (a) providing a vertically oriented drain on a downwind side of the pond, the drain having an upper open free-end spaced above the level of the surface of the pond in absence of wind; and
    (b) utilizing the pile-up of the surface water at the downwind side of the pond to create a hydraulic head relative to the open free-end of the drain whereby surface water and debris floating thereon are drawn toward and into the drain and are removed thereby.

2. A method according to claim 1, wherein wetting retarders are added to the solution in the pond to enhance retention of dust particles in the upper layer of the pond.

3. A method according to claim 1, wherein in edges of the pond or a portion thereof are so designed as to enable overflow when the wind is blowing and allow removal of the debris floating on the surface of the pond.

4. A method according to claim 1, wherein collector means are provided within the pond adapted to receive the solution by overflow when a wind is blowing.

5. A method according to claim 4, wherein two oppositely located drainage means are provided, one facing the wind during the day and the other facing the wind during the night.

6. A method according to claim 5, wherein said drainage means comprise mobile collector means.

7. A method according to claim 6, wherein said mobile collector means are floating in the pond.

8. A method according to claim 1, wherein the skimming of an upper aqueous layer from the pond is brought about with the aid of suitably located suction pumps.

9. A method according to claim 1, wherein intermittent or continuous skimming of an upper aqueous layer from the pond is brought about by fitting the pond with at least one vertically reciprocable gate which in its uppermost position retains the solution in the pond while in a lower position enables a free flow of an upper layer from the pond.

10. A method according to claim 1, wherein an upper layer of the pond is skimmed continuously by fitting the pond with at least one collector means which are slightly depressed below the surface of the solution in the pond.

11. Apparatus comprising:
    (a) a salt-water solar pond having an upper convective wind mixed layer covering a halocline that has a downwardly directed salt gradiant which overlies a heat storage layer;
    (b) a vertically-oriented drain on a downwind side of the pond, said drain having an upper open free-end spaced above the level of the surface of the pond in the absence of wind; and
    (c) means for maintaining the free open end of the drain at a predetermined spacing from the surface of the pond independently of the level of water in the pond.

12. Apparatus according to claim 11 wherein said drain floats in the pond for maintaining the free open end of the drain at a predetermined spacing from the surface thereof independent of the level of water in the pond.

13. Apparatus according to claim 11 wherein said drain includes a vertically reciprocable gate having a closed position for preventing surface water in the pond from flowing into the drain except when the wind speed exceeds a threshold, and an open position for effecting entry of surface water in the pond into the drain when the wind speed is below said threshold.

* * * * *

UNITED STATES PATENT AND TRADEMARK OFFICE
CERTIFICATE OF CORRECTION

PATENT NO. : 4,579,105

DATED : April 1, 1986

INVENTOR(S) : Moshe Marikovsky

It is certified that error appears in the above-identified patent and that said Letters Patent is hereby corrected as shown below:

```
At column 4, line 24 of the printed patent, "gradiant"
should be changed to ---gradient---.
```

Signed and Sealed this

Fifth Day of July, 1988

Attest:

DONALD J. QUIGG

Attesting Officer

Commissioner of Patents and Trademarks